(12) United States Patent
Yan

(10) Patent No.: US 8,039,545 B2
(45) Date of Patent: Oct. 18, 2011

(54) FUNCTIONALIZED POLYMERS

(75) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/254,284

(22) Filed: Oct. 20, 2008

(65) Prior Publication Data

US 2009/0105408 A1    Apr. 23, 2009

Related U.S. Application Data

(60) Provisional application No. 60/999,900, filed on Oct. 22, 2007.

(51) Int. Cl.
*C08C 19/25* (2006.01)
*C08C 19/22* (2006.01)
*C08F 8/30* (2006.01)
*C08K 3/36* (2006.01)
*C08L 23/36* (2006.01)

(52) U.S. Cl. ........ 524/572; 525/102; 525/105; 525/123; 525/131; 524/526

(58) Field of Classification Search .......... 525/123, 525/131, 105, 102; 524/572
See application file for complete search history.

(56) References Cited

U.S. PATENT DOCUMENTS

| | | | |
|---|---|---|---|
| 3,859,382 A * | 1/1975 | Hergenrother et al. | 525/123 |
| 4,299,932 A * | 11/1981 | Hergenrother et al. | 525/130 |
| 4,321,343 A * | 3/1982 | Rooney | 525/534 |
| 4,742,117 A * | 5/1988 | Tsutsumi et al. | 528/98 |
| 5,011,888 A | 4/1991 | Tsutsumi et al. | |
| 5,017,636 A | 5/1991 | Hattori et al. | |
| 5,750,604 A | 5/1998 | Banning et al. | |
| 5,919,839 A | 7/1999 | Titterington et al. | |
| 6,191,234 B1 | 2/2001 | Tadaki et al. | |
| 6,372,863 B1 | 4/2002 | Kerns et al. | |
| 6,437,205 B1 * | 8/2002 | Miller et al. | 585/12 |
| 6,472,464 B1 | 10/2002 | Morita et al. | |
| 6,984,706 B2 | 1/2006 | Karato et al. | |
| 7,202,306 B2 | 4/2007 | Tanaka et al. | |
| 7,288,594 B2 | 10/2007 | Ozawa et al. | |
| 7,294,680 B2 | 11/2007 | Sone et al. | |
| 7,342,070 B2 | 3/2008 | Tsukimawashi et al. | |
| 2004/0230010 A1 * | 11/2004 | Kwag et al. | 525/331.9 |
| 2005/0020757 A1 | 1/2005 | Ozawa et al. | |
| 2008/0015309 A1 | 1/2008 | Ozawa et al. | |
| 2008/0045664 A1 | 2/2008 | Sone et al. | |

FOREIGN PATENT DOCUMENTS

WO    WO 2006/030806 A1 *    3/2006
WO    WO 2009/021917 A1    2/2009

* cited by examiner

*Primary Examiner* — Fred M Teskin

(74) *Attorney, Agent, or Firm* — Meredith E. Hooker; Zollinger & Burleson Ltd.

(57) ABSTRACT

A functionalized polymer includes a polymer chain and a terminal group linked to the chain through a functionality that contains one or more urethane groups. The functionalized polymer can be provided by reacting a nucleophile with a polymer having terminal iso(thio)cyanate functionality which, in turn, can be provided by reacting a terminally active polymer with a polyiso(thio)cyanate. Even polymers that contain substantial amounts of styrene mer can be used in the described process.

10 Claims, No Drawings

FUNCTIONALIZED POLYMERS

CROSS REFERENCE TO RELATED APPLICATION

This application claims the benefit of U.S. provisional application no. 60/999,900, filed 22 Oct. 2007, the entire disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

In one aspect is provided a functionalized polymer having the general formula $\pi\text{-Q-J}_m$ where $\pi$ is a polymer (typically including diene mer), J is a functional group that includes at least one heteroatom, m is an integer of from 1 to 3 inclusive, and Q is a linking group of the general formula —C(Z)NH—R—[NHC(Z)]$_m$— in which each Z independently is an oxygen or sulfur atom and R is a substituted or unsubstituted aromatic or $C_1$-$C_{40}$ aliphatic hydrocarbylene group (e.g., alkylene, arylene, etc.).

In another aspect is provided a functionalized polymer that includes a polymer chain and terminal functionality having the general formula —C(Z)NH—R—[NHC(Z)R']$_m$ where Z, m and R are defined as above and where R' is the radical of a nucleophile including at least one heteroatom selected from O, S, N and Si. This polymer can be the reaction product of a living or pseudo-living polymer that includes terminal iso(thio)cyanate functionality with a nucleophile that includes one, or preferably two or more, heteroatoms selected from O, S, N and Si.

In other aspects are provided the foregoing functionalized polymers in compositions that further include one or more organic liquids in which the polymer(s) is/are at least partially soluble (solvents) and/or particulate filler(s), vulcanizates provided from compositions that include such polymers and particulate filler(s), methods for making the polymers, and methods for providing vulcanizates that include such polymers and particulate filler(s).

The polymers preferably include polyene mer units. In certain embodiments, the polyenes can be conjugated dienes, and the resulting conjugated diene mer can incorporated substantially randomly along the polymer chain. The polymers alternatively or in addition can be substantially linear.

Regardless of particular characteristics, the functionalized polymers can interact with particulate filler such as, e.g., carbon black and silica.

Other aspects of the present invention will be apparent to the ordinarily skilled artisan from the detailed description that follows. To assist in understanding that description of various embodiments, certain definitions (which are intended to apply throughout unless the surrounding text explicitly indicates a contrary intention) are provided immediately below:

"polymer" means the polymerization product of one or more monomers and is inclusive of homo-, co-, ter-, tetrapolymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"high styrene SBR" means a styrene/butadiene interpolymer where the weight percentage of bound styrene is at least 20%, at least 25%, at least 30%, or even at least 37% and can range up to about 45%;

"lanthanide compound" means a compound that includes at least one atom of La, Nd, Ce, Pr, Pm, Sm, Eu, Gd, Tb, Dy, Ho, Er, Tm, Yb, Lu, and didymium (a mixture of rare-earth elements that can be obtained from monazite sand);

"organoaluminum compound" means a compound containing at least one Al-C bond;

"organomagnesium compound" means compound containing at least one Mg-C bond;

"radical" means the portion of a molecule that remains after reacting with another molecule, regardless of whether any atoms are gained or lost as a result of the reaction;

"drop temperature" is a prescribed upper temperature at which a filled rubber composition (vulcanizate) is evacuated from mixing equipment (e.g., a Banbury mixer) to a mill for being worked into sheets;

"iso(thio)cyanate" means a group of the general formula —N=C=O or —N=C=S or a compound that includes such a group;

"polyiso(thio)cyanate" means a compound with two or more iso(thio)cyanate groups and specifically includes di-, tri- and tetraiso(thio)cyanates;

"urethane" means a group having the general formula -C(Z)NH- where Z is an oxygen or sulfur atom;

"terminus" means an end of a polymeric chain; and

"terminal moiety" means a group or functionality located at a terminus.

DETAILED DESCRIPTION OF ILLUSTRATIVE EMBODIMENTS

As apparent from the Summary section, the functionalized polymers include functionality, typically at a terminus, bound to the polymer chain through a urethane linkage.

One of more of the polymers of the composition can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Depending on the intended end use, one or more of the polymer chains can include pendent aromatic groups, which can be provided, e.g., through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from ~1 to ~60%, from ~10 to ~55%, or from ~20 to ~50%, of the polymer chain. The microstructure of such interpolymers can be random, i.e., the mer units derived from each type of constituent monomer do not form blocks and, instead, are incorporated in a non-repeating, essentially simultaneous manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

Polyenes can incorporate into polymeric chains in more than one way. Especially for tire tread applications, controlling this manner of incorporation can be desirable. A polymer chain with an overall 1,2-microstructure, given as a numerical percentage based on total moles of polyene mer, of from ~10 to ~80%, optionally from ~25 to ~65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene mer, is considered to be "substantially linear". For certain end use applications, however, keeping the content of 1,2-linkages even lower—e.g., to less than about ~7%, less than ~5%, less than ~2%, or less than ~1%—can be desirable.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75. Exemplary $M_n$ values range from ~5000 to ~200,000, commonly from ~25,000 to ~150,000, and typically from ~50,000 to ~125,000.

Such polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Depending on the nature of the polymer desired, the particular conditions of the solution polymerization can vary significantly. In the discussion that follows, living polymerizations are described first followed by a description of pseudo-living polymerizations. After these descriptions, the functionalization and processing of polymers so made are discussed.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2'-di(tetrahydrofuryl) propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for function-alization and/or quenching.

Certain end use applications call for polymers that have properties that can be difficult or inefficient to achieve via anionic or living polymerizations. For example, in some applications, conjugated diene polymers having high cis-1,4-linkage contents can be desirable. Such polydienes can be prepared by processes using lanthanide-based catalysts and may display pseudo-living characteristics.

A pseudo-living catalyst composition can include a lanthanide compound, an alkylating agent, and a compound including a labile halogen atom. Where the lanthanide compound and/or alkylating agent include a labile halogen atom, the catalyst need not include a separate halogen source, i.e., the catalyst may simply include a halogenated lanthanide compound and an alkylating agent. In some embodiments, the alkylating agent can include both an aluminoxane and an alkyl aluminum compound. In other embodiments, a non-coordinating anion or non-coordinating anion precursor may be employed in lieu of a halogen source. Where the alkylating agent includes a hydride compound, the halogen source may include a tin halide as disclosed in U.S. Pat. No. 7,008,899. In these or other embodiments, other organometallic compounds (e.g., a nickel-containing compound may as disclosed in U.S. Pat. No. 6,699,813) or Lewis bases also may be employed.

Various lanthanide compounds or mixtures thereof can be employed. These compounds can be soluble in hydrocarbon solvents such as those discussed previously with respect to living polymerizations or can be suspended in the polymerization medium to form a catalytically active species.

The lanthanide atom in the lanthanide compounds can be in various oxidation states, e.g., 0, +2, +3, and +4. Exemplary lanthanide compounds include lanthanide carboxylates, organophosphates, organophosphonates, organophosphinates, carbamates, dithiocarbamates, xanthates, β-diketonates, alkoxides or aryloxides, halides, pseudo-halides, and oxyhalides, as well as organolanthanide compounds. Exemplary lanthanide compounds include, but are not limited to neodymium carboxylates such as neodymium formate, neodymium acetate, neodymium acetate, neodymium (meth)acrylate, neodymium valerate, etc.; neodymium organophosphates such as various neodymium dialkyl phosphates, neodymium dioleyl phosphate, neodymium diphenyl phosphate, etc.; neodymium organophosphonates such as various neodymium alkyl phosphonates, neodymium oleyl phosphonate, neodymium phenyl phosphonate, etc.; neodymium organophosphonates such as various neodymium(di)alkylphosphinates, neodymium(di)phenylphosphinate, neodymium(p-nonylphenyl)phosphinate, neodymium bis(p-nonylphenyl)phosphinate, etc.; neodymium carbamates such as various neodymium dialkylcarbamates, neodymium dibenzylcarbamate, etc.; neodymium dithiocarbamates such as various neodymium dialkyldithiocarbamates and neodymium dibenzyldithiocarbamate; neodymium xanthates such as various neodymium alkylxanthates, neodymium benzylxanthate, etc.; neodymium β-diketonates such as neodymium acetylacetonate, neodymium trifluoroacetylacetonate, neodymium hexafluoroacetylacetonate, neodymium benzoylacetonate, neodymium 2,2,6,6-tetramethyl-3,5-heptanedionate, etc.; neodymium alkoxides or aryloxides such as various neodymium alkoxides, neodymium phenoxide, neodymium nonylphenoxide, neodymium naphthoxide, etc.; neodymium halides such as $NdF_3$, $NdCl_3$, $NdBr_3$, and $NdI_3$; neodymium pseudo-halides such as $Nd(CN)_3$, $Nd(OCN)_3$, neodymium thiocyanate, neodymium azide, neodymium ferrocyanide, etc.; and neodymium oxyhalides such as NdOF, NdOCl, NdOBr, etc. (The foregoing list is limited to Nd compounds for the sake of simplicity, but this extensive list easily can be used by the ordinarily skilled artisan to identify and select similar compounds employing other lanthanide metals.)

Various alkylating agents or mixtures thereof can be used. Alkylating agents include organometallic compounds that can transfer hydrocarbyl groups to another metal. Typically, these agents include organometallic compounds of electropositive metals such as those from Groups 1, 2, and 3 (Groups IA, IIA, and IIIA). Common alkylating agents include organoaluminum and organomagnesium compounds, some of which are soluble in the types of hydrocarbon solvents described above. Where the alkylating agent includes a labile halogen atom, the alkylating agent may also serve as the halogen-containing compound.

Organoaluminum compounds include those represented by the formula $AlR_nX_{3-n}$ where each R independently is a monovalent organic group attached to the Al atom via a C atom; each X independently is a H atom, a halogen atom, a carboxylate group, an alkoxide group, or an aryloxide group; and n is an integer of from 1 to 3. Each R can be a hydrocarbyl group (which can contain heteroatoms such as N, O, B, Si, S, and P) such as, but not limited to, (cyclo)alkyl, substituted (cyclo)alkyl, (cyclo)alkenyl, substituted (cyclo)alkenyl, aryl, substituted aryl, aralkyl, alkaryl, allyl, and alkynyl groups.

Organoaluminum compounds include trihydrocarbylaluminum compounds such as various trialkylaluminums, tris(1-methylcyclopentyl)aluminum, triphenylaluminum, tri-p-tolylaluminum, tris(2,6-dimethylphenyl)aluminum, tribenzylaluminum, various dialkylphenylaluminum, various dialkylbenzylaluminums, various alkyldibenzylaluminums, etc.; dihydrocarbylaluminum hydrides such as various dialkylaluminum hydrides, diphenylaluminum hydride, di-p-tolylaluminum hydride, dibenzylaluminum hydride, various phenylalkylaluminum hydrides, various phenyl-n-alkylaluminum hydrides, various phenylisoalkylaluminum hydrides, various p-tolylalkylaluminum hydrides, various benzylalkylaluminum hydrides, etc.; hydrocarbylaluminum dihydrides such as various alkylaluminum dihydrides; dihydrocarbylaluminum chloride compounds such as various dialkylaluminum chlorides, diphenylaluminum chloride, di-p-tolylaluminum chloride, dibenzylaluminum chloride, various phenylalkylaluminum chlorides, various p-tolylalkylaluminum chlorides, various benzylalkylaluminum chlorides, etc.; and hydrocarbylaluminum dichlorides such as various alkylaluminum dichlorides. Other organoaluminum compounds include various dialkylaluminum alkanoates, various alkylaluminum bisalkanoates, various dialkylaluminum alkoxides and phenoxides, various alkylaluminum dialkoxides and diphenoxides, etc.

Also useful are aluminoxanes including oligomeric linear aluminoxanes and oligomeric cyclic aluminoxanes represented by the respective general formulae

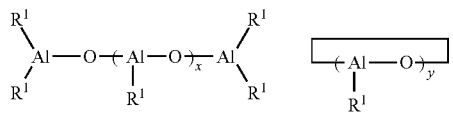

where x can be an integer of from 1 to ~100 or from ~10 to ~50; y may be an integer of from 2 to ~100 or from ~3 to ~20; and each $R^1$ independently may be a monovalent organic group attached to the Al atom via a C atom. Each $R^1$ can be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups; these hydrocarbyl groups may contain heteroatoms such as those mentioned above. (The number of moles of the aluminoxane as used herein refers to the number of moles of the aluminum atoms rather than the number of moles of the oligomeric aluminoxane molecules.)

Aluminoxanes can be prepared by reacting trihydrocarbylaluminum compounds with water. This reaction can be performed by, e.g., (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Potentially useful aluminoxane compounds include one or more of methylaluminoxane (MAO), modified methylaluminoxane (MMAO, which can be formed by substituting ~20-80% of the methyl groups of MAO with $C_2$-$C_{12}$ hydrocarbyl groups, preferably isobutyl groups), any of a variety of alkylaluminoxanes (particularly isobutylaluminoxane), any of a variety of cycloalkylaluminoxanes, phenylaluminoxane, various alkyl-substituted phenylaluminoxanes, etc.

One class of useful organomagnesium compounds can be represented by the formula $R^2_z MgX_{2-z}$ where each $R^2$ independently is a monovalent organic group attached to the Mg atom via a C atom, z is an integer of from 1 to 2 inclusive, and X is a hydrogen atom, a halogen atom, a carboxylate group, an alkoxide group, or an aryloxide group. Each R can be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups; these hydrocarbyl groups may contain heteroatoms such as those set forth previously. Examples of the foregoing include dihydrocarbylmagnesium compounds such as various dialkylmagnesiums (particularly dibutylmagnesium), diphenylmagnesium, dibenzylmagnesium, and mixtures thereof; various alkylmagnesium hydrides, halides, carboxylates, alkoxides, aryloxides, and mixtures thereof; and various arylmagnesium hydrides, halides, carboxylates, alkoxides, aryloxides, and mixtures thereof.

Various compounds, or mixtures thereof, that contain one or more labile halogen atoms can be employed as the halogen source. These compounds may simply be referred to as halogen-containing compounds. A combination of two or more halogen atoms can also be utilized. Certain halogen-containing compounds can be soluble in a hydrocarbon solvent while others can be suspended in the oligomerization medium to form the catalytically active species. (Where neodymium halides, oxyhalides, or other compounds containing labile halogen atoms are employed, the Nd-containing compound can serve as both the lanthanide compound as well as the halogen-containing compound; a Lewis base such as THF may be employed as an aid for solubilizing this class of neodymium compounds in inert organic solvents.)

Types of halogen-containing compounds include, but are not limited to, elemental halogens, mixed halogens (e.g., ICl, IBr, $ICl_5$, and $IF_5$), hydrogen halides (e.g., HF, HCl, HBr, etc.), organic halides such as various alkyl halides, various allyl halides, various benzyl halides, various halo-di-phenylalkanes, various triphenylalkyl halides, various benzylidene halides, various alkyltrichlorosilanes, phenyltrichlorosilane, various dialkyldichlorosilanes, diphenyldichlorosilane, various trialkylchlorosilanes, benzoyl halides, propionyl halides, and methyl haloformates; inorganic halides such as $PCl_3$, $PBr_3$, $PCl_5$, $POCl_3$, $POBr_3$, $BF_3$, $BCl_3$, $BBr_3$, $SiF_4$, $SiCl_4$, $SiBr_4$, $SiI_4$, $AsCl_3$, $AsBr_3$, $AsI_3$, $SeCl_4$, $SeBr_4$, $TeCl_4$, $TeBr_4$, and $TeI_4$; metallic halides such as $SnCl_4$, $SnBr_4$, $AlCl_3$, $AlBr_3$, $SbCl_3$, $SbCl_5$, $SbBr_3$, $AlI_3$, $AlF_3$, $GaCl_3$, $GaBr_3$, $GaI_3$, $GaF_3$, $InCl_3$, $InBr_3$, $InI_3$, $InF_3$, $TiCl_4$, $TiBr_4$, $TiI_4$, $ZnCl_2$, $ZnBr_2$, $ZnI_2$, and $ZnF_2$; organometallic halides such as various dialkylaluminum halides, various alkylaluminum dihalides, various alkylaluminum sesquihalides, various alkylmagnesium halides, various phenylmagnesium halides, various benzylmagnesium halides, various trialkyltin halides, various dialkyltin dihalides, and various trialkyltin halides; and mixtures thereof.

Non-coordinating anions include bulky anions that do not form coordinate bonds with, for example, the active center of a catalyst system, due to steric hindrance. Non-coordinating anions include tetraarylborate anions (which optionally can be fluorinated). Ionic compounds containing non-coordinating anions are known in the art, and also include a counter-cation such as a carbonium (e.g., triarylcarbonium), ammonium, or phosphonium cation. An exemplary material is tetrakis(pentafluorophenyl)borate.

Non-coordinating anion precursors include substances that can form a non-coordinating anion under reaction conditions. Non-coordinating anion precursors include trihaloalkyl boron compounds.

The foregoing catalyst compositions can have high catalytic activity for polymerizing conjugated dienes into stereospecific polydienes over a wide range of catalyst concentrations and catalyst ingredient ratios. The catalyst ingredients can interact to form an active catalyst species, and the optimum concentration for any one ingredient can depend on the concentrations of the other ingredients.

The molar ratio of alkylating agent to lanthanide compound (alkylating agent/Ln) can range from ~1:1 to ~1000:1, from ~2:1 to ~500:1, or from ~5:1 to ~200:1. Where both an alkyl aluminum compound and an aluminoxane are employed as alkylating agents, the molar ratio of alkyl aluminum to lanthanide compound (Al/Ln) can range from ~1:1 to ~200:1, from ~2:1 to ~150:1, or from ~5:1 to ~100:1, and the molar ratio of the aluminoxane to the lanthanide compound (aluminoxane/Ln) can range from ~5:1 to ~1000:1, from ~10:1 to ~700:1, or from ~20:1 to ~500:1. The molar ratio of the halogen-containing compound to the lanthanide compound (halogen atom/Ln) can range from ~1:2 to ~20:1, from ~1:1 to ~10:1, or from ~2:1 to ~6:1.

The molar ratio of non-coordinating anion or non-coordinating anion precursor to lanthanide compound (An/Ln) can range from ~1:2 to ~20:1, from ~3:4 to ~10:1, or from ~1:1 to ~6:1.

The degree of interaction or reaction between the various ingredients or components is not easily determined; accordingly, the term "catalyst composition" is intended to encompass a simple mixture of the ingredients, a complex of the various ingredients that is caused by physical or chemical forces of attraction, a chemical reaction product of the ingredients, or a combination of the foregoing. The catalyst composition can be formed by various methods.

The catalyst composition may be formed in situ by adding the catalyst ingredients to a solution containing monomer and solvent, or simply bulk monomer, in either a stepwise or simultaneous manner; for example, the alkylating agent can be added first, followed by the lanthanide compound, and then followed by the halogen-containing compound, if used, or by the non-coordinating anion or non-coordinating anion precursor.

Alternatively, the catalyst ingredients can be mixed outside the polymerization system at a temperature of from about −20° to ʃ80° C., and the resulting catalyst composition added to the polymerization vessel, optionally after aging for up to a few days.

The catalyst composition also may be formed in the presence of at least one conjugated diene monomer. That is, the catalyst ingredients may be pre-mixed in the presence of a small amount of conjugated diene monomer at a temperature of from about −20° to ~80° C. The amount of conjugated diene monomer that may be used can range from ~1 to ~500 moles, from ~5 to ~250 moles, or from ~10 to ~100 moles, per mole of the lanthanide compound. The resulting catalyst composition can be aged for a few minutes to a few days prior to being added to the remainder of the conjugated diene monomer.

Alternatively, the catalyst composition may be formed by using a multistage procedure. The first stage can involve combining the alkylating agent with the lanthanide compound in the absence of conjugated diene monomer or in the presence of a small amount of conjugated diene monomer at a temperature of from about −20° to ~80° C. The foregoing reaction mixture and the halogen-containing compound, non-coordinating anion, or non-coordinating anion precursor can be charged in either a stepwise or simultaneous manner to the remainder of the conjugated diene monomer.

When a solution of the catalyst composition or one or more of the catalyst ingredients is prepared outside the polymerization system, an organic solvent or carrier may be employed. The organic solvent may serve to dissolve the catalyst composition or ingredients, or the solvent may simply serve as a carrier in which the catalyst composition or ingredients may be suspended. The organic solvent may be inert to the catalyst composition. Useful solvents include those described previously.

Production of polymer can be accomplished by polymerizing conjugated diene(s) in the presence of a catalytically effective amount of the foregoing catalyst composition. The total catalyst concentration to be employed in the polymerization mass may depend on the interplay of various factors such as the purity of the ingredients, polymerization temperature, polymerization rate and conversion desired, desired molecular weight, and the like. Accordingly, a specific total catalyst concentration cannot be definitively set forth except to say that catalytically effective amounts of the respective catalyst ingredients can be used. The amount of the lanthanide compound used can be varied from ~0.01 to ~2 mmol, from ~0.02 to ~1 mmol, or from ~0.05 to ~0.5 mmol, per 100 g of conjugated diene.

Polymerization can be carried out in an organic solvent as the diluent. Both the monomer to be polymerized and the polymer formed are soluble in the polymerization medium. Alternatively, a precipitation polymerization system may be employed by choosing a solvent in which the polymer formed is insoluble. In both cases, the monomer to be polymerized may be in a condensed phase. Also, the catalyst ingredients may be solubilized or suspended within the organic solvent; here and in other embodiments, the catalyst ingredients or components are unsupported or not impregnated into a catalyst support. In other embodiments, the catalyst ingredients or components may be supported.

In performing these polymerizations, an amount of organic solvent in addition to the amount of organic solvent that may be used in preparing the catalyst composition may be added to the polymerization system. The additional organic solvent may be the same as or different from the organic solvent used in preparing the catalyst composition. An organic solvent that is inert with respect to the catalyst composition employed to catalyze the polymerization may be selected. Exemplary hydrocarbon solvents have been set forth above. When a solvent is employed, the concentration of the monomer to be polymerized may not be limited to a special range. In one or more embodiments, however, the concentration of the monomer present in the polymerization medium at the beginning of the polymerization can range from ~3 to ~80%, from ~5 to ~50%, or from ~10 to ~30% (all by weight).

Polymerization of conjugated dienes may also be carried out by means of bulk polymerization, which refers to a polymerization environment where substantially no solvents are employed, either in a condensed liquid phase or in a gas phase. Polymerization of conjugated dienes also may be carried out as a batch process, a continuous process, or a semi continuous process.

Polymers prepared by employing a lanthanide-based catalyst composition may include reactive chain ends prior to terminating or quenching the polymerization.

Regardless of which type of polymerization process is employed, the solubilized polymer commonly is referred to as "polymer cement" because of its relatively high concentration of polymer and very high viscosity. Prior to being quenched, the polymer chains in the polymer cement can undergo further reactions so as to be provided with terminal functionality.

One method for achieving the desired functionalization begins by reacting one or more polyiso(thio)cyanates with the living or pseudo-living polymer chains. One mole of active polymer chains theoretically can consume only one of the iso(thio)cyanate groups in one equivalent of polyiso(thio)cyanates, while the remaining one, two or three iso(thio)cyanate groups remain available for further reaction with nucleophilic reagents. This type of one-to-one reaction can be promoted when low concentrations of highly hydrocarbon soluble polyiso(thio)cyanates are used, particularly where the polymer cement includes carbanions having relatively low reactivity, e.g., high styrene SBR.

Potentially useful polyiso(thio)cyanates include those with the general formula R—(N=C=Z)$_n$ where n is an integer of from 2 to 4 inclusive, each Z independently is O or S, and R is a substituted or unsubstituted aromatic or $C_1$-$C_{40}$ aliphatic hydrocarbylene group (e.g., alkylene, arylene, etc.) Exemplary polyiso(thio)cyanates include, but are not limited to, 1,6-diisocyanatohexane (HDI), trimethyl-1,6-diisocyanatohexane (TMDIH), 4,4'-methylenebis(cyclohexyl isocyanate) (H-MDI), 4,4'-methylenebis(phenyl isocyanate) (MDI), p-phenylene diisothiocyanate, tolylene-2,4-diisocyanate, tolylene-2,5-diisocyanate tolylene-2,6-diisocyanate, naphthalene diisocyanate, 1,6-diisocyanatohexane, isophorone diisocyanate, trimethyl-1,6-diicocyanato-hexane (mixture of 2,2,4- and 2,4,4-isomers), benzene-1,2,4-triisocyanate, triphenylmethane triisocyanate, tris(isocyanate phenyl) thiophosphate, naphthalene-1,3-7-triisocyanate, naphthalene-1,2,5,7-tetraisocyanate, and the like.

Most of the foregoing polyiso(thio)cyanates are readily soluble in the types of solvents employed in the above-described polymerizations and, accordingly, can be added directly to the polymerization vessel or to a post-polymerization reaction vessel to which the polymer cement is transferred; for those diiso(thio)cyanates that are insoluble or insufficiently soluble, the ordinarily skilled artisan is familiar with alternative delivery techniques. Polyiso(thio)cyanates are sufficiently reactive with living and pseudo-living polymer chains that no special temperature and/or pressure conditions are believed to be necessary, and this reaction can be performed quickly (e.g., ~5-60 minutes) using relatively mild (e.g., ~25° to ~75° C., atmospheric or slightly elevated pressures, anhydrous and anaerobic) conditions. Mixing of a type commonly employed in commercial processes is sufficient to achieve near stoichiometric reaction.

The use of a polyiso(thio)cyanate provides a particular advantage where the polymer cement includes high styrene SBR. Compared to butadiene mer, styrene mer is much less to susceptible to termination/reaction with active hydrogen-containing species. For example, addition of methyl triethoxysilane typically results in immediate reaction with and termination of carbanionic styrene/butadiene interpolymers; however, with high styrene SBR, this reaction does not proceed to completion, even at elevated temperatures (e.g., 60 minutes at 65° C.). Conversely, any of a variety of polyiso (thio)cyanates have been found to react readily with high styrene SBR even at moderate temperatures (e.g., ~20°-50° C.).

After this initial reaction, most or all of the polymer chains include terminal functionality of the general formula —C(Z)NH—R—(N═C═Z)$_m$ where Z, m and R are as defined as above. Some or all of the remaining iso(thio)cyanate group(s) can react further so as to provide a functionalized polymer having the general formula π-Q-J$_m$ where π is a polymer chain, J is a functional group that includes at least one heteroatom and Q is a linking group of the general formula —C(Z)NH—R—[NHC(Z)]$_m$—(with Z, m, R being defined as above). This can be accomplished by reaction with any of a variety of nucleophiles, particularly active hydrogen atom-containing groups such as alcohols, thiols, amines, carboxylic acids, and the like.

Where a nucleophile is the further reactant, upon completion of this second reaction, a polymer chain includes terminal functionality of the general formula —C(Z)NH—R—[NHC(Z)R']$_m$ where R' is the radical of the nucleophilic reactant. The radical of the nucleophile typically includes at least one heteroatom selected from O, S, N and Si and, in certain embodiments, can include at least two such heteroatoms. Examples of potentially useful multi-heteroatom-containing nucleophiles include HOR"NH$_2$, HSR"NH$_2$, HOR"SH, H$_2$NR"NH$_2$, HSR"Si(OR$^3$)$_3$, H$_2$NR"Si(OR$^3$)$_3$, and the like, where R" represents a substituted or unsubstituted divalent aliphatic and aromatic group or a group containing a heteroatom (such as, e.g., O, S, N, P, and the like) and R$^3$ represents a hydrogen atom or a substituted or unsubstituted alkyl, alkenyl, cycloalkyl, cycloalkenyl, aryl, allyl, aralkyl, alkaryl, or alkynyl group. Of the foregoing, those that include at least one Si atom might find particular utility where the polymer is to be compounded with particulate fillers that include silica. Also potentially useful are 2,4,6-triamino-1,3, 5-triazine (melamine), 1,2-diaminocyclohexane (CHDA), and the like.

Like the preceding reaction, no special temperature and/or pressure conditions are believed to be necessary to ensure that this reaction is completed quickly (e.g., ~15-60 minutes) using relatively mild (e.g., ~25°-75° C. and atmospheric or slightly elevated pressures) conditions. Mixing of a type commonly employed in commercial processes is sufficient to ensure near stoichiometric reaction. To promote maximum interaction with particulate fillers, more than a stoichiometric amount of the nucleophile(s) relative to the polymer chains (e.g., ~1:1 to ~3:1) can be added to the reaction vessel.

While a separate quenching step is not required, it can be performed if desired. The polymer and an active hydrogen-containing compound (e.g., an alcohol or water) can be stirred for up to ~120 minutes at temperatures of from ~30° to ~150° C.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

Prior to processing, stored synthetic rubber (regardless of form such as, e.g., slab, wigwag, etc.) preferably resists flow, i.e., exhibits good cold-flow resistance. However, when blended or milled with other ingredients during compounding (as discussed in detail below) at elevated temperatures, resistance to flow no longer necessarily is desirable, i.e., an excessive resistance to flow can compromise or hinder processability. A synthetic rubber with a good balance of these properties is desirable.

The functionalized polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber (EPR), ethylene/propylene/diene rubber (EPDM), acrylonitrile/butadiene rubber (NBR), silicone rubber, fluoroelastomers, ethylene/acrylic rubber, ethylene/vinyl acetate ethylene/vinyl acetate interpolymer (EVA), epichlorohydrin rubbers, chlorinated polyethylene rubbers, chlorosulfonated polyethylene rubbers, hydrogenated nitrile rubber, tetrafluoroethylene/pro ylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica (SiO$_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 m$^2$/g, and useful ranges of surface include from ~32 to ~400 m$^2$/g, from ~100 to ~250 m$^2$/g, and from ~150 to ~220 m$^2$/g.

The pH of the silica filler is generally from about 5 to about 7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 parts by weight (pbw) per 100 parts of polymer (phr), preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 m$^2$/g, preferably at least ~35 m$^2$/g, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to ~100 phr.

When silica is employed as a reinforcing filler, addition of a coupling agent such as a silane is customary so as to ensure good mixing in, and interaction with, the elastomer(s). Generally, the amount of silane that is added ranges between ~4 and ~20%, based on the weight of silica filler present in the elastomeric compound.

Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, N.Y., 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

The relevant disclosures of all patent and technical documents mentioned above are incorporated herein by reference.

The following non-limiting, illustrative examples provide the reader with detailed conditions and materials that can be useful in the practice of the present invention. All values given in the form of percentages hereinthroughout are weight percentages unless the surrounding text explicitly indicates a contrary intention.

EXAMPLES

In the examples, dried glass vessels previously sealed with extracted septum liners and perforated crown caps under a positive N$_2$ purge were used for all preparations. Butadiene (20.2% in hexane), styrene (33% in hexane), hexane, n-butyllithium (1.60 M in hexane), 2,2-bis(2'-tetrahydrofuryl)propane solution (1.6 M in hexane, stored over CaH$_2$), potassium t-amylate (KTA) (1.0 M in hexane), 3-[N,N-di(trimethylsilane)aminopropyl](diethoxy)methylsilane (1.0 M in hexane), and butylated hydroxytoluene (BHT) solution (in hexane) were used.

Commercially available reagents and starting materials included the following, all of which were acquired from Sigma-Aldrich Co. (St. Louis, Mo.) and used without further purification unless otherwise noted in a specific example (with purities noted in parentheses): TMDIH (99%), HDI (98%), H-MDI (mixture of isomers, 90%), MDI (98%), p-phenylene diisothiocyanate (98%), (t)trans-1,2-diaminocyclohexane (CHDA) (99%), 1,6-hexanediamine (99%), (3-aminopropyl)triethoxysilane (APTEOS) (99%), 3-[2-(2-aminoethylamino)ethylamino]propyl-trimethoxysilane (technical grade), and N-[3-(trimethoxysilyl)propyl]ethylenediamine (97%).

Testing was performed on vulcanizable compounds prepared according to the two-stage (carbon black as sole type of filler) formulation shown in Table 1a and the silica-only formulation shown in Table 1b, where N-phenyl-N'-(1,3-dimethylbutyl)-p-phenyldiamine acts as an antioxidant, N-(t-butyl)-2-benzothiazole sulfenamide, 2,2'-dithiobis(benzothiazole) and N,N'-diphenylguanidine act as accelerators, and the low aromatic processing oil was an extender oil having relatively low amounts of aromatic compounds in general (typically less than ~20% by weight) and polycyclic aromatic compounds specifically (typically less than ~3% by weight).

TABLE 1a

Compound formulation, carbon black

| | Amount (phr) |
|---|---|
| Masterbatch | |
| polymer | 100 |
| carbon black (N343 type) | 50 |
| wax | 2 |
| N-phenyl-N'-(1,3-dimethylbutyl)-p-phenyldiamine | 0.95 |
| stearic acid | 2 |
| low aromatic processing oil | 10 |
| Final | |
| sulfur | 1.5 |
| N-(t-butyl)-2-benzothiazole sulfenamide | 0.5 |
| 2,2'-dithiobis(benzothiazole) | 0.5 |
| N,N'-diphenylguanidine | 0.3 |
| ZnO | 2.5 |
| TOTAL | 170.25 |

TABLE 1b

Compound formulation, silica

| | Amount (phr) |
|---|---|
| Masterbatch | |
| polymer | 80 |
| natural rubber | 20 |
| silica | 52.5 |
| wax | 2 |
| N-phenyl-N'-(1,3-dimethylbutyl)-p-phenyldiamine | 0.95 |
| stearic acid | 2 |
| low aromatic processing oil | 10 |
| Re-mill | |
| silica | 2.5 |
| silane | 5 |
| Final | |
| sulfur | 1.5 |
| N-(t-butyl)-2-benzothiazole sulfenamide | 0.7 |
| 2,2'-dithiobis(benzothiazole) | 2 |
| N,N'-diphenylguanidine | 1.4 |
| ZnO | 2.5 |
| TOTAL | 183.05 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Dispersion index" were calculated using the equation $$DI = 100 - \exp[A \times \log_{10}(F^2 H) + B]$$

where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

Data corresponding to "Bound rubber" were determined using the procedure described by J. J. Brennan et al., *Rubber Chem. and Tech.*, 40, 817 (1967).

Examples 1-3

Control and Comparative Anionically Initiated Polymers

To a $N_2$-purged reactor equipped with a stirrer was added 1.38 kg hexane, 0.41 kg styrene solution, and 2.69 kg butadiene solution. The reactor was charged with 3.27 mL n-butyllithium, followed by 1.10 mL 2,2-bis(2'-tetrahydrofuryl)propane solution. The reactor jacket was heated to 50° C. and, after ~38 minutes, the batch temperature peaked at ~59° C. After an additional ~30 minutes, polymer cement was transferred from the reactor to dried glass vessels.

A control (sample 1) was terminated with isopropanol while a comparative (sample 2) was reacted with ~0.45 mL (3×) 1-methyl-2-pyrrolidinone (1.0 M in toluene); both vessels were allowed to sit in a 50° C. bath for ~30 minutes. Thereafter, each was coagulated in isopropanol containing BHT and drum dried.

Examples 3-8

Polymers Reacted with Diisocyanate and Functionalizing Agents

The addition sequence utilized in Examples 1-2 was repeated. The reactor jacket was heated to 50° C. and, after ~38 minutes, the batch temperature peaked at ~58° C.

After an additional ~30 min., 5.2 mL TMDIH (1.0 M in hexane) diluted in 40 mL hexane was added to the polymer cement, which was stirred at 50° C. for another ~20 min.

The polymer cement then was transferred from the reactor to dried glass vessels. To the various vessels were added, respectively
  sample 3: 0.4 mL (2×) deionized water,
  sample 4: 0.44 mL (2×) CHDA (1.0 M in hexane),
  sample 5: 0.44 mL (2×) 1,6-hexanediamine (1.0 M in hexane),
  sample 6: 0.44 mL (2×) APTEOS (1.0M in hexane),
  sample 7: 0:44 mL (2×) N-[3-(trimethoxysilyl)propyl]ethylenediamine (1.0 M in hexane), and
  sample 8: 0.44 mL (2×) 3-[2-(2-aminoethylamino)ethylamino]propyl-trimethoxysilane (1.0 M in hexane).
Each vessel was allowed to sit in a 50° C. bath for ~30 minutes. Thereafter, each was coagulated in isopropanol containing BHT and drum dried.

Additional testing was performed on vulcanizable compounds prepared according to the carbon black formulation shown in Table 1a. Results of physical testing on these compounds are shown below in Table 2. (The Mooney viscosity measurements were taken at 100° C.)

sample 10: 0.4 mL (3×) deionized water,
sample 11: 0.45 (4×) mL N-[3-(trimethoxysilyl)propyl]ethylenediamine (1.0 M in hexane), and
sample 12: 0.45 (4×) 3-[2-(2-aminoethylamino)ethylamino]propyltrimethoxysilane (1.0 M in hexane).

TABLE 2

Physical properties, polymers and filled compounds

|  | 1 | 2 | 3 | 4 | 5 | 6 | 7 | 8 |
|---|---|---|---|---|---|---|---|---|
| $M_n$ (kg/mol) | 99 | 99 | 179 | 174 | 183 | 162 | 129 | 133 |
| $M_w/M_n$ | 1.04 | 1.07 | 1.38 | 1.29 | 1.30 | 1.48 | 1.68 | 1.85 |
| % coupling | 0.0 | 0.0 | 71.8 | 75.0 | 77.8 | 73.4 | 66.8 | 59.2 |
| $T_g$ (° C.) | −34.5 | −33.8 | −34.2 | −34.2 | −34.2 | −34.2 | −35.0 | −35.4 |
| Dispersion index | 94.1 | 94.2 | 88.6 | 90.3 | 88.8 | 88.7 | 87.0 | 83.6 |
| Bound rubber | 7.2 | 36.4 | 24.1 | 32.3 | 25.5 | 24.7 | 25.9 | 48.8 |
| $ML_{1+4}$, polymer only | 8.6 | 12.0 | 73.8 | 66.4 | 71.5 | 70.3 | 79.1 | 84.0 |
| $ML_{1+4}$, compound | 28.1 | 77.9 | 72.3 | 79.5 | 83.3 | 83.4 | 85.4 | 88.1 |
| 171° C. MDR $t_{50}$ (min) | 2.62 | 2.09 | 2.25 | 2.19 | 2.10 | 2.19 | 2.18 | 2.07 |
| 171° C. MH-ML (kg-cm) | 15.6 | 14.5 | 14.3 | 14.8 | 14.7 | 14.6 | 13.8 | 13.4 |
| 300% modulus @ 23° C. (MPa) | 9.030 | 11.641 | 10.457 | 10.755 | 11.104 | 11.595 | 11.082 | 11.447 |
| Tensile strength @ 23° C. (MPa) | 19.1 | 18.8 | 19.6 | 20.1 | 21.2 | 21.4 | 17.7 | 20.5 |
| Temp. sweep 0° C. tan δ | 0.476 | 0.612 | 0.493 | 0.486 | 0.477 | 0.491 | 0.494 | 0.485 |
| Temp. sweep 60° C. tan δ | 0.246 | 0.104 | 0.155 | 0.144 | 0.143 | 0.132 | 0.124 | 0.111 |
| RDA 0.25-14% ΔG' (MPa) | 4.136 | 0.306 | 0.730 | 0.746 | 0.774 | 0.731 | 0.598 | 0.457 |
| 60° C. RDA strain sweep (5% strain) tan δ | 0.2513 | 0.0996 | 0.1299 | 0.1293 | 0.1256 | 0.1239 | 0.1165 | 0.1025 |
| 0° C. Dynastat tan δ | 0.3459 | 0.5598 | 0.4894 | 0.5094 | 0.5036 | 0.5054 | 0.5060 | 0.4529 |
| 30° C. Dynastat tan δ | 0.2613 | 0.1389 | 0.1617 | 0.1589 | 0.1598 | 0.1584 | 0.1532 | 0.1368 |
| 60° C. Dynastat tan δ | 0.2310 | 0.0964 | 0.1285 | 0.1219 | 0.1218 | 0.1177 | 0.1119 | 0.1035 |

The data from Table 2 indicate, inter alia, that filled compositions made from functionalized polymers according to the present invention (Examples 3-8) compared to filled compositions made from a control polymer (Example 1) exhibit significant reductions in tan δ (each of temperature sweep, strain sweep, and Dynastat at both 30° and 60° C.), all of which are indicative of reduced hysteresis, as well as increases in bound rubber content, tensile strength and significant reductions in ΔG' (Payne effect). Further, these improvements rival those that can be achieved with 1-methyl-2-pyrrolidinone, which is recognized as a prime functionalizing agent.

Examples 9-13

High Styrene SBR Reacted with Diisocyanate and Functionalizing Agents

To a $N_2$-purged reactor equipped with a stirrer was added 1.75 kg hexane, 0.76 kg styrene solution, and 1.98 kg butadiene solution. The reactor was charged with 3.2 mL n-butyllithium and 0.32 mL KTA followed by 0.17 mL 2,2-bis(2'-tetrahydrofuryl)propane solution. The reactor jacket was heated to ~82° C. and, after 22 minutes, the batch temperature peaked at ~91° C. After an additional ~30 minutes at 50° C., the polymer cement (which was pink in color) was transferred from the reactor to dried glass vessels.

After a control (sample 9) was terminated with isopropanol, its vessel was allowed to sit in a 65° C. bath for ~60 minutes. Thereafter, the polymer cement was coagulated in isopropanol containing BHT and drum dried.

The foregoing procedure was essentially repeated. After heating the reactor jacket to ~82° C. and holding for ~20 minutes, the batch temperature peaked at ~90° C. After an additional ~30 minutes at 50° C., 5.2 mL TMDIH (1.0 M in hexane) diluted in 40 mL hexane was added to the polymer cement, which was stirred at 50° C. for an additional ~20 minutes. The polymer cement then was transferred from the reactor to dried glass vessels. To the various vessels were added, respectively Each vessel was allowed to sit in a 50° C. bath for ~40 minutes. Thereafter, each was coagulated in isopropanol containing BHT and drum dried.

Additional testing was performed on vulcanizable compounds prepared according to the silica formulation shown in Table 1b. Results of physical testing on these compounds are shown below in Table 3. (The Mooney viscosity measurements were taken at 100° C.)

TABLE 3

Physical properties, polymers and filled compositions

|  | 9 | 10 | 11 | 12 |
|---|---|---|---|---|
| $M_n$ (kg/mol) | 131 | 175 | 183 | 175 |
| $M_w/M_n$ | 1.07 | 1.55 | 1.58 | 1.50 |
| % coupling | 0.0 | 53.3 | 75.0 | 46.5 |
| $T_g$ (° C.) | −39.4 | −34.2 | −37.0 | −35.7 |
| Dispersion index | 82.6 | 84.1 | 74.2 | 86.1 |
| Bound rubber | 20.5 | 31.6 | 44.3 | 38.1 |
| $ML_{1+4}$, polymer only | 50.8 | 79.2 | 96.7 | 86.0 |
| $ML_{1+4}$, compound | 28.1 | 72.3 | 79.5 | 83.3 |
| 171° C. MDR $t_{50}$ (min) | 1.99 | 2.1 | 2.34 | 2.18 |
| 171° C. MH-ML (kg-cm) | 20.7 | 19.8 | 18.3 | 19.1 |
| 300% modulus @ 23° C. (MPa) | 9.363 | 9.611 | 10.095 | 10.265 |
| Tensile strength @ 23° C. (MPa) | 17.1 | 16.9 | 21.0 | 20.5 |
| Temp. sweep 0° C. tan δ | 0.495 | 0.468 | 0.542 | 0.554 |
| Temp. sweep 60° C. tan δ | 0.164 | 0.140 | 0.117 | 0.132 |
| RDA 0.25-14% ΔG' (MPa) | 5.359 | 3.284 | 2.282 | 2.722 |
| 60° C. RDA strain sweep (5% strain) tan δ | 0.1838 | 0.1433 | 0.1184 | 0.1284 |
| 0° C. Dynastat tan δ | 0.3457 | 0.3898 | 0.4573 | 0.4942 |
| 30° C. Dynastat tan δ | 0.1762 | 0.1522 | 0.1449 | 0.1591 |
| 60° C. Dynastat tan δ | 0.1288 | 0.1089 | 0.0941 | 0.1011 |

The data from Table 3 indicate, inter alis, that filled compositions made from functionalized polymers according to the present invention (Examples 11-12), compared to filled compositions made from a control polymer (Example 9) as well as those made from a comparative polymer (Example 10), exhibit significant reductions in tan δ at 60° C. (each of temperature sweep, strain sweep, and Dynastat), all of which are indicative of reduced hysteresis, as well as improved wet traction (increases in tan δ at 0° C., both temperature sweep and Dynastat).

That which is claimed is:

1. A method for providing a functionalized polymer comprising:
   a) using a lanthanide-based catalyst composition to polymerize one or more polyenes so as to provide a terminally active polymer,
   b) reacting said terminally active polymer with a polyiso(thio)cyanate so as to provide a polymer with terminal iso(thio)cyanate functionality, and
   c) reacting said polymer with terminal iso(thio)cyanate functionality with a nucleophile comprising at least one Si atom and at least one N atom, thereby providing said functionalized polymer.

2. The method of claim 1 wherein said nucleophile has the general formula $$H_2NR''Si(OR^3)_3$$

where
   R" is a substituted or unsubstituted divalent aliphatic group, a substituted or unsubstituted aromatic group, or a group comprising a heteroatom, and
   $R^3$ is a hydrogen atom or a substituted or unsubstituted alkyl, alkenyl, cycloalkyl, cycloalkenyl, aryl, allyl, aralkyl, alkaryl, or alkynyl group.

3. The method of claim 1 wherein said nucleophile is (3-aminopropyl)triethoxysilane.

4. The method of claim 1 further comprising blending one or more types of particulate filler, and optionally at least one rubber, with said functionalized polymer so as to provide a tread stock compound.

5. The method of claim 4 wherein said one or more types of particulate filler comprises silica.

6. The method of claim 4 further comprising vulcanizing said tread stock compound.

7. A method for providing a functionalized polymer comprising:
   a) using a lanthanide-based catalyst composition to polymerize one or more polyenes so as to provide a terminally active polymer,
   b) reacting said terminally active polymer with a polyiso(thio)cyanate so as to provide a polymer with terminal iso(thio)cyanate functionality, and
   c) reacting said polymer with terminal iso(thio)cyanate functionality with a nucleophile having the general formula $$HSR''Si(OR^3)_3$$

where
   R" is a substituted or unsubstituted divalent aliphatic group, a substituted or unsubstituted aromatic group, or a group comprising a heteroatom, and
   $R^3$ is a hydrogen atom or a substituted or unsubstituted alkyl, alkenyl, cycloalkyl, cycloalkenyl, aryl, allyl, aralkyl, alkaryl, or alkynyl group,
thereby providing said functionalized polymer.

8. The method of claim 7 further comprising blending one or more types of particulate filler, and optionally at least one rubber, with said functionalized polymer so as to provide a tread stock compound.

9. The method of claim 8 wherein said one or more types of particulate filler comprises silica.

10. The method of claim 8 further comprising vulcanizing said tread stock compound.

* * * * *